July 15, 1969  G. W. SWIFT ET AL  3,455,116

HELIUM PURIFICATION EMPLOYING PROPANE SCRUBBING

Filed Jan. 3, 1967

INVENTORS
FRED KURATA
GEORGE W. SWIFT
BY
Cruzan Alexander
ATTORNEY

United States Patent Office 3,455,116
Patented July 15, 1969

3,455,116
HELIUM PURIFICATION EMPLOYING PROPANE SCRUBBING
George W. Swift, Lawrence, Kans., and Fred Kurata, Lima, Peru, assignors to The Kansas University Endowment Association, Lawrence, Kans., a nonprofit corporation of Kansas
Filed Jan. 3, 1967, Ser. No. 606,900
Int. Cl. F25j 3/08
U.S. Cl. 62—17        4 Claims

ABSTRACT OF THE DISCLOSURE

Crude gaseous helium is introduced into a scrubbing zone where it is scrubbed with propane to remove the major impurity, nitrogen. The propane and nitrogen mixture leaving the bottom of the scrubber is stripped with the stripped propane returning to the scrubber. Purified gaseous helium from the top of the scrubber is work expanded causing the remaining impurities to be liquefied and separated from the pure helium product in a separation zone.

---

Figure 1:
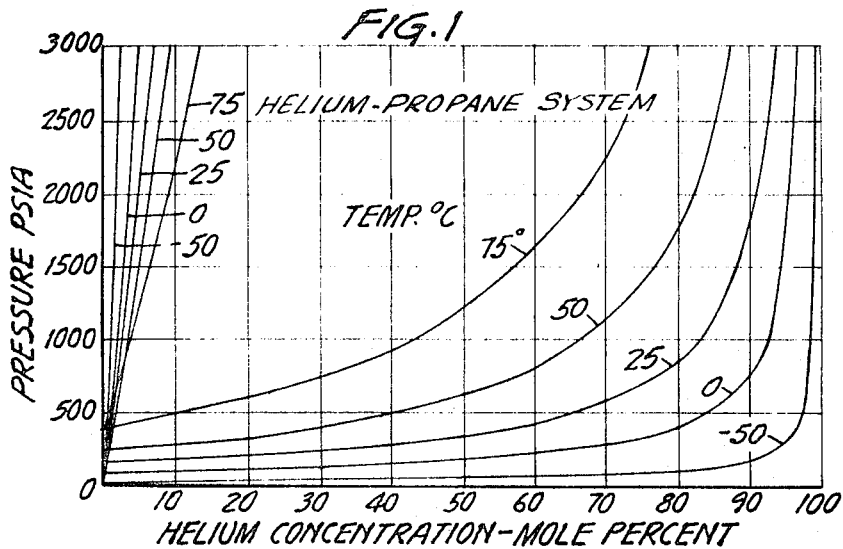

This invention relates to the purification of low boiling gases. Generally the invention relates to the removal of low boiling impurities such as nitrogen and carbon monoxide from a crude feed having a major constituent boiling below −245° C. such as hydrogen or helium. In one aspect this invention relates to the making of grade A helium. In another aspect this invention relates to the making of pure hydrogen.

The current process for making grade A helium (99.998% pure) is by compressing, cooling, and separating the crude helium stream until the vapor phase helium concentration reaches about 98%. The 98% helium is then passed through an activated carbon bed maintained at liquid nitrogen temperature (−195° C.) to adsorb the residual nitrogen to produce the grade A helium.

Crude helium consists of about 70 mol percent helium and 30 mol percent nitrogen with traces of methane and other hydrocarbons. It is now being produced by several private concerns in Kansas, Oklahoma and Texas. The crude helium is sold to the Federal Government which stores it. The major portion of crude helium is eventually converted to grade A helium and sold by the Government.

As stated before, the current process for making grade A helium is by compression and refrigeration followed by adsorption. More particularly, crude helium after being compressed, is cooled in stages from ambient temperatures down to liquid nitrogne temperature or lower. After each compression and/or cooling step, the nitrogen rich liquid which condenses out is separated from the gas phase which contains most of the helium. The final pressure can be several hundred pounds per square inch and the final temperature is −195° C. or lower. The compression and cooling steps finally reduce the nitrogen content to about 2%. The 98% helium is then passed through an adsorbent bed maintained at −195° C. to produce the grade A helium. This current process, carried out at low temperatures, requires considerable power for compression and refrigeration.

An object of the present invention is to provide a process for the removal of nitrogen from other low boiling gases.

Another object is to provide a process for making highly pure helium or hydrogen.

Other objects and advantages of the present invention will become apparent from the accompanying description and disclosure.

The purification process of the present invention applies to low boiling gases which contain low boiling impurities of higher boiling points than the gas to be purified.

In the process of the present invention, the low boiling impurities such as nitrogen or carbon monoxide are removed from a low boiling gas stream containing same, such as a helium gas stream or a hydrogen gas stream, by scrubbing with a suitable liquefied hydrocarbon solvent such as propane. The solvent should be such that replacement of impurity by solvent in the scrubbed pure gas gives a mixture more amenable to final cleanup, e.g. propane can be much more readily removed from helium than can nitrogen (impurity) from helium (product). Solvents of the paraffinic, naphthenic, and aromatic hydrocarbon families and mixtures thereof that remain liquid at temperatures down to about −50 to −100° C. are suitable.

The product from the scrubber will then comprise purified helium or hydrogen and a small amount of propane or other solvent. The residual propane or other solvent in the purified helium or hydrogen is then removed by phase separation or by other conventional techniques such as by cooling followed by passing it through an activated carbon or other adsorbent bed whereby grade A helium is produced.

Since the capacity and affinity of the adsorbent bed is much greater for hydrocarbons than for nitrogen, the adsorption, if this technique is used, can be carried out at a higher temperature and removal of propane is much more complete than for nitrogen. The purified helium can also be permeated through quartz tubes or other material to remove the propane and produce the grade A product.

Another important aspect of this invention takes advantage of the "reverse solubility" of helium in a hydrocarbon solvent. For most gases, the solubility of the gas in a hydrocarbon solvent increases with decreasing temperature at a given pressure. In the case of helium, its solubility decreases with decreasing temperature.

In the scrubbing process some helium will become dissolved in the solvent in addition to the nitrogen. Unless some steps are taken, the helium dissolved in the solvent will be lost when the nitrogen is separated from the solvent. The dissolved helium can be recovered by flashing the hydrocarbon solvent effluent from the scrubber to lower pressure in two or more stages at different temperatures. The gases removed by the low temperature flash will contain most of the dissolved helium because of its low solubility. This gas can be recycled to the helium feed stream. The gases flashed off at higher temperatures will be mostly nitrogen because of its lower solubility at higher temperatures. The temperatures and pressures selected for these flashes can be optimized to give maximum recovery of the helium (product) from the hydrocarbon while minimizing vaporization of nitrogen.

Figure 2:
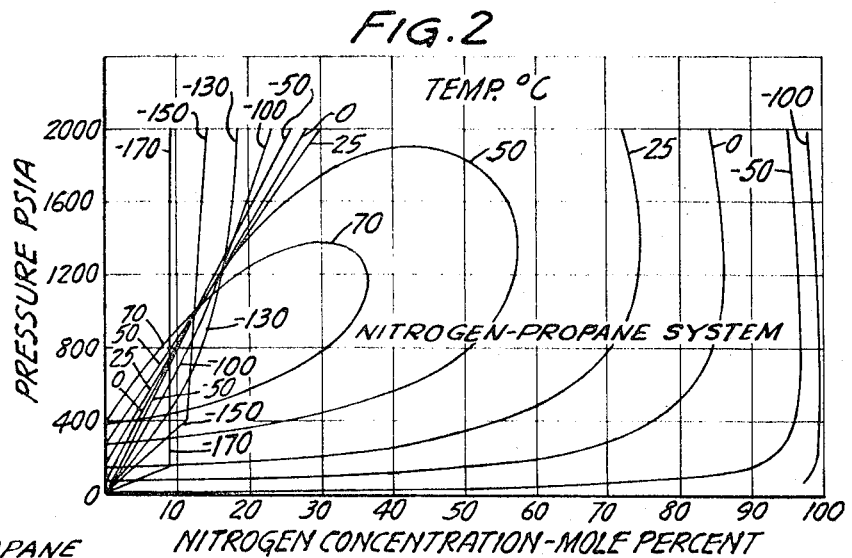
Figure 3:
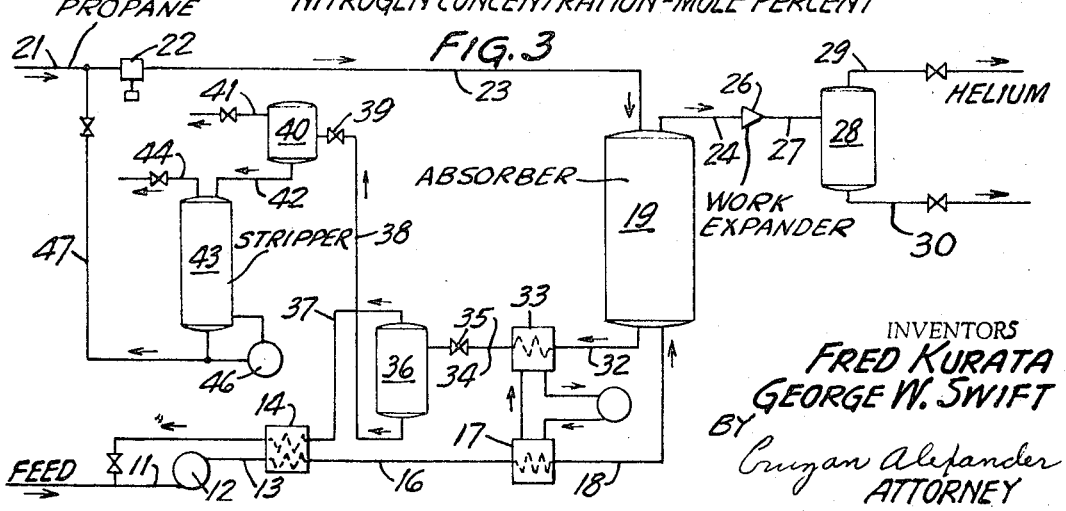

The phase equilibrium relationships for the complete system must be known to take full advantage of the present technique, e.g. in the helium-nitrogen-propane system the helium demonstrates the reverse solubility phenomenon which favors good scrubbing action at reasonably high temperatures when conducted at elevated pressures. Also, in the same system, for the type of operation depicted in the accompanying process flow diagram of FIGURE 3 of the drawings, one must take care to operate above the locus of critical solution points which corresponds closely to the vapor pressure curve of nitrogen. Accordingly, FIGURE 1 of the drawings shows the pressure-composition diagram for the helium-propane system for selected isotherms and FIGURE 2 shows the pressure-composition diagram for the nitrogen-propane system for selected isotherms. These diagrams enable one to set the conditions for operation of the process as described in connection with the process illustrated in FIGURE 3.

The accompanying drawing is a diagrammatic flowsheet in elevation illustrating a specific embodiment of the present invention in which pressures are pounds per square inch absolute and percentages are mole percent. According to the drawing, crude selium entering through conduit 11 comprising about 30% nitrogen and about 70% helium is purified to produce a helium pure product containing 0.002% or less nitrogen. Crude helium gas is passed at a flowrate of 71.57 pound moles per hour through conduit 11 to compressor 12 where the crude helium gas stream is compressed from 2000 pounds gauge to 2500 pounds gauge and then is passed by conduit 13 through precooler 14 and by conduit 16 through cooler 17 whereby the crude helium gas is cooled from about 21° C. to 0° C. The cooled helium gas is then passed through conduit 18 to absorber 19. The composition of the helium stream entering absorber 19 is approximately 0.24% propane, 29.67% nitrogen and 70.09% helium. The propane in the above stream is the result of the recycle stream introduced into the feed stream 11 through conduit 37. A liquid propane scrubbing stream containing not more than 0.0003% nitrogen is passed through conduits 21 and 23 for introduction into absorber 19. The propane stream in conduit 21 is at a pressure of 68 pounds and a temperature of 0° C. The nitrogen content of the propane stream is the result of recycle of purified propane from conduit 47 into conduit 21. Liquid propane from pump 22 at a pressure of 2500 pounds gauge and 0° C. is passed at the rate of 402.091 lb. mol/hr. (including 5.29 lb. mol/hr. of makeup propane) to the top of absorber 19 through conduit 23. Absorber 19 comprises a conventional absorption tower with a suitable number of trays. A gaseous helium stream containing 2.686% propane, 0.002% nitrogen and 97.312% helium is romoved from the top of absorber 19 at a pressure of 2500 pounds and at a temperature of 0° and is passed to expander 26. The gaseous helium stream is expanded in expander 26 to approximately atmospheric pressure whereby the temperature is reduced to −174° C. The cooled and expanded gaseous helium stream is in partially liquefied form and is passed through conduit 27 to liquid-vapor separator 28 where separation is made between liquid and vapor. Purified helium gas (43.60 lb. mol/hr.) containing 0.002% nitrogen is removed from the top of separator 28 through conduit 29 as the product of the process. Liquid propane (1.21 lb. mol/hr.) is removed from the bottom of separator 28 through conduit 31 containing less than 0.001% nitrogen. This stream of propane may be recycled to conduit 21 by means not shown.

Liquid propane is removed from the bottom of absorber 19 through conduit 32. This liquid propane stream in conduit 32 is at 2500 pounds pressure and a temperature of 0° C. and contains 90.019% propane, 5.879% nitrogen and 4.102% helium. Liquid propane is passed through conduit 32 to cooler 33 and then through conduit 34 to liquid-vapor separator 36. The liquid stream in conduit 34 is expanded through expansion valve 35 to a pressure of 2000 pounds. As the result of cooling in cooler 33 and expansion through valve 35 the stream entering separator 36 is partially vaporized and cooled to −50° C. Vapor from separator 36 containing 1.262% propane, 28.259% nitrogen and 70.479% helium is passed (16.72 lb. mol/hr.) at a temperature of −50° C. through conduit 37 in heat exchange with precooler 14 and recycled to conduit 11. The temperature of this helium stream introduced into conduit 11 through conduit 37 is at about 21° C. Since the solubility of helium in propane is low at the temperature of separator 36, the vapor in conduit 37 contains most of the dissolved helium in the scrubbing medium. In this manner the helium in the scrubbing medium is also recovered.

From the bottom of separator 36, liquid comprising 93.479% propane, 5.007% nitrogen and 1.514% helium at −50° C. is passed (428.852 lb. mol/hr.) through conduit 38 through expansion valve 39 to separator 40 where the pressure of this stream is reduced from 2000 pounds to 68 pounds. A vaporous nitrogen stream (28.49 lb. mol/hr.) comprising 8.20% propane, 69.00% nitrogen and 22.80% helium is removed from the top of separator 40 through conduit 41 and vented to the atmosphere or burned as fuel. Alternatively, this stream could be compressed, cooled, and passed through another separator by means not shown to provide a liquid stream from which propane could be recovered, and a vapor stream, containing helium, to be returned to conduit 11.

From the bottom of separator 40, liquid comprising 99.55% propane and 0.45% nitrogen is removed through conduit 42 and passed to the top of a conventional stripper 43. This stream may be heat exchanged with the crude helium in conduit 11 by means not shown, if desired. Stripper 43 is maintained at a bottom temperature of 0° C. and at a top temperature of −50° C. by reboiler 46. A nitrogen rich vapor stream (3.56 lb. mol/hr.) is removed from the top of stripper 43 by means of conduit 44 and vented to the atmosphere or burned as fuel. This nitrogen rich stream comprises 50.9% nitrogen and 49.1% propane. Stripped liquid propane (396.80 lb. mol/hr.) comprising less than about 0.0003% nitrogen is passed from stripper 43 at 0° C. and 68 pounds pressure through conduit 47 to conduit 21 for recycle in the process.

The above is a description of one specific embodiment of the invention but it is to be understood that other operating conditions can be used to achieve similar results. Insofar as the temperature and pressure of the process of this invention are concerned, two liquid phases form in the propane-nitrogen system below −146° C. The upper temperature limit will be near the critical temperature of propane, 100° C. The formation of the second liquid phase below −146° C. can be avoided by proper selection of pressure or propane circulation rate. Therefore, the absorber 19 can be operated down to the temperature where solid forms, in this case about −188° C. In order to avoid the formation of a second liquid phase, absorber 19 can be operated at a pressurs lower that the 3-phase locus pressure at temperatures below −146° C. Or, the propane circulation rate can be set so the nitrogen concentration will be less than the equilibrium concentration in the propane rich liquid layer when two liquid phases are present.

This means that above −146° C. the absorber 19 operating temperature and pressure can be set independently. Below −146° C. the tower pressure must be below the 3-phase pressure. Or, the propane or solvent circulation rate can be set so that the second liquid phase does not form. By these means the temperature range of the absorber can be extended from about −188° C. to about 100° C.

By operating at low temperatures (−180° C. or so) the vapor pressure of propane is so low that the helium or hydrogen may have the desired purity without further purification as is shown by expander 26 and separator 28 of FIGURE 1. This temperature varies with absorption pressure.

Economics will be the controlling factor in selecting the optimum temperature and pressure. At lower temperatures, the solubility of nitrogen in propane will be greater and the solubility of helium in propane will be smaller. Therefore, a smaller amount of propane is needed for recirculation through the scrubber. However, the refrigeration cost will increase with decreasing temperature.

Having described our invention, we claim:

1. A process for making grade A helium which comprises introducing into a scrubbing zone crude gaseous helium containing nitrogen as the major impurity, introducing into said scrubbing zone liquefied propane solvent, maintaining said scrubbing zone at a temperature, pressure and contact ratio between crude helium and liquefied propane solvent such that the propane remains liquid and the crude helium and its nitrogen impurity remain gaseous, removing liquefied propane containing nitrogen impurity therein from said scrubbing zone, and removing from said scrubbing zone purified gaseous helium.

2. A process for making grade A helium which comprises introducing into a scrubbing zone crude gaseous helium containing nitrogen as the major impurity, introducing into said scrubbing zone a liquefied propane solvent, maintaining said scrubbing zone at a temperature between −188° C. and 100° C. and under a pressure and a contact ratio between crude helium and liquefied solvent such that a gas phase and single liquid phase are produced, removing liquefied solvent from said scrubbing zone containing nitrogen impurity from said crude helium, and removing from said scrubbing zone purified helium.

3. The process of claim 2 in which propane is separated from purified helium by phase separation at reduced temperature.

4. A process for making grade A helium which comprises introducing into a scrubbing zone crude gaseous helium containing nitrogen as an impurity, introducing into said scrubbing zone a liquefied propane, maintaining said scrubbing zone at a temperature between −188° C. and 100° C. and under a pressure and a contact ratio between crude helium and liquefied propane such that a gas phase and single liquid phase are produced, removing liquefied propane from said scrubbing zone containing nitrogen impurity from said crude helium, stripping nitrogen from said liquefied propane from said scrubbing zone, recycling stripped propane to said scrubbing zone, removing from said scrubbing zone purified helium substantially free of nitrogen and containing propane, separating propane from helium by work expanding to liquefy the propane and recovering purified helium as a product of the process.

References Cited

UNITED STATES PATENTS

| 3,026,682 | 3/1962 | Palazzo et al. | 62—23 XR |
| 3,062,015 | 11/1962 | Cost | 62—23 XR |
| 3,282,060 | 11/1966 | Hays | 62—24 |

FOREIGN PATENTS

| 637,479 | 2/1962 | Canada. |

OTHER REFERENCES

Cryogenic Washing Scrubs Hydrogen For Liquid-Fueled Rockets by Eugene Guccione, Chemical Engineering, May 13, 1963, pp. 150–152.

NORMAN YUDKOFF, Primary Examiner

V. W. PRETKA, Assistant Examiner

U.S. Cl. X.R.

55—66; 62—23